US012703639B2

(12) United States Patent
Nickel et al.

(10) Patent No.: US 12,703,639 B2
(45) Date of Patent: Aug. 11, 2026

(54) PROCESS FOR PREPARING LITHIUM SALTS SUCH AS ANHYDROUS LITHIUM HYDROXIDE AND ANHYDROUS LITHIUM HALIDES

(71) Applicant: AMG LITHIUM GMBH, Frankfurt (DE)

(72) Inventors: Vera Nickel, Haiger (DE); Hannes Vitze, Idstein (DE); Christine Gabbey, Marburg (DE); Stefanie Riehl, Rodermark (DE); Stefan Scherer, Griesheim (DE); Martin Janssen, Nauheim (DE); Rebecca Spielau, Eppstein (DE)

(73) Assignee: AMG LITHIUM GMBH, Frankfurt (DE)

( * ) Notice: Subject to any disclaimer, the term of this patent is extended or adjusted under 35 U.S.C. 154(b) by 712 days.

(21) Appl. No.: 18/022,608

(22) PCT Filed: Sep. 1, 2021

(86) PCT No.: PCT/EP2021/074130
§ 371 (c)(1),
(2) Date: Feb. 22, 2023

(87) PCT Pub. No.: WO2022/049123
PCT Pub. Date: Mar. 10, 2022

(65) Prior Publication Data

US 2023/0312359 A1 Oct. 5, 2023

(30) Foreign Application Priority Data

Sep. 2, 2020 (EP) .................................... 20194139

(51) Int. Cl.
*C01D 15/02* (2006.01)
*C01D 15/04* (2006.01)
(Continued)

(52) U.S. Cl.
CPC ............ *C01D 15/04* (2013.01); *C01D 15/02* (2013.01); *H01M 6/185* (2013.01);
(Continued)

(58) Field of Classification Search
CPC ...... C01D 15/02; C01D 15/04; C01P 2006/82
See application file for complete search history.

(56) References Cited

U.S. PATENT DOCUMENTS 2,968,526 A 1/1961 Verdieck et al.
3,872,220 A * 3/1975 Smith, Jr. .............. C01D 15/04 423/499.3
2020/0165129 A1 5/2020 Vitze et al.

FOREIGN PATENT DOCUMENTS

CN 101565192 A * 10/2009
CN 108584992 A 9/2018
(Continued)

OTHER PUBLICATIONS

Machine translation of Chen (CN108584992), Sep. 28, 2018.*
(Continued)

*Primary Examiner* — Jun L
(74) *Attorney, Agent, or Firm* — Tim Tingkang Xia, Esq.; Troutman Pepper Locke LLP

(57) ABSTRACT

The present invention relates to a method for producing lithium salts, such as lithium hydroxide and lithium halides, wherein the lithium salts obtained are substantially free of water and optionally other impurities, such as lithium carbonate and/or lithium oxide. Moreover, the present invention refers to lithium salts, such as lithium hydroxide and lithium halides obtainable by said method, as well as their use for the production of e.g. solid electrolytes, lithium metal or lithium carbonate.

10 Claims, 2 Drawing Sheets

Figure 1:
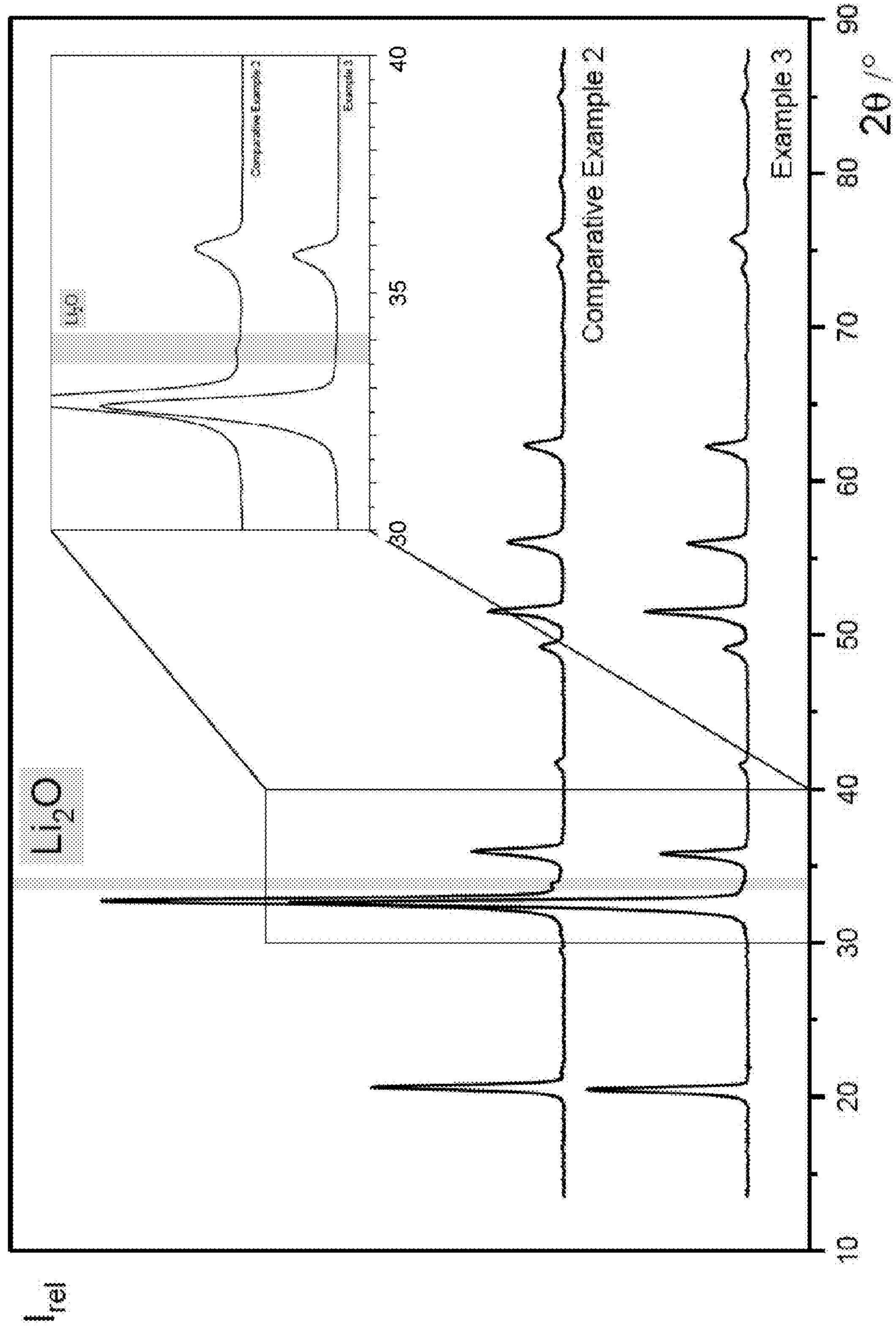

(51) Int. Cl.
*H01M 6/18* (2006.01)
*H01M 10/0562* (2010.01)

(52) U.S. Cl.
CPC ..... *H01M 10/0562* (2013.01); *C01P 2002/72* (2013.01); *C01P 2002/82* (2013.01); *C01P 2006/82* (2013.01); *H01M 2300/0068* (2013.01)

(56) References Cited

FOREIGN PATENT DOCUMENTS

| | | | | | |
|---|---|---|---|---|---|
| CN | 109442870 | A | | 3/2019 | |
| CN | 110759363 | A | * | 2/2020 | ............ C01D 15/04 |
| JP | 2006265023 | A | | 10/2006 | |
| JP | 201895550 | A | | 6/2018 | |
| WO | WO-2016070217 | A1 | * | 5/2016 | ............ C01D 15/02 |
| WO | 2018086862 | A1 | | 5/2018 | |
| WO | 2020165129 | A1 | | 8/2020 | |

OTHER PUBLICATIONS

Machine translation of Li (CN 109442870), Mar. 8, 2019.*
Machine translation of Wu (CN101565192), Oct. 28, 2009.*
International Search Report issued by the European Patent Office on Dec. 22, 2021 for International Application No. PCT/EP2021/074130.
European Search Report issued by the European Patent Office on Mar. 4, 2021, for Application No. 20 194139.0, Europe.
Database WPI, Week 201872, Feb. 22, 2021, Thomson Scientific , London GB, AN 2018-795833 XP002802184.

* cited by examiner

PROCESS FOR PREPARING LITHIUM SALTS SUCH AS ANHYDROUS LITHIUM HYDROXIDE AND ANHYDROUS LITHIUM HALIDES

The present invention relates to a method for producing lithium salts, such as lithium hydroxide and lithium halides, wherein the lithium salts obtained are substantially free of water and optionally other impurities, such as lithium carbonate and/or lithium oxide. Moreover, the present invention refers to lithium salts, such as lithium hydroxide and lithium halides obtainable by said method, as well as their use for the production of e.g. solid electrolytes, lithium metal or lithium carbonate.

Lithium salts such as lithium hydroxide and lithium chloride are used as raw materials in the field of electrochemical energy storage systems, e.g. lithium-ion batteries.

The salts lithium hydroxide and lithium chloride are known to physically and chemically absorb water i.e. in form of crystal water or residual moisture. However, even traces of water in starting materials, intermediates or end products of lithium containing energy storage systems can cause problems e.g. in view of dosing, process safety, product reproducibility, yields, energy density, etc.

For instance, the exact crystal water content is decisive for the desired stoichiometric weight of sample taken for synthesis. However, due to aging, storage and transport, the water content of lithium hydroxide and lithium halides can vary considerably. Furthermore, lithium hydroxide tends to clump together due to the presence of crystal water and/or physically bound moisture, making handling and dosing very difficult.

Moreover, lithium hydroxide tends to convert or calcine into lithium oxide under excessive drying conditions, thereby contaminating the lithium hydroxide starting material.

It is also known that lithium hydroxide and its hydrates easily react with carbon dioxide from the air at room temperature forming lithium carbonate. However, the presence of lithium carbonate impurities in the lithium hydroxide starting material must be avoided, as outgassing of carbon dioxide in an energy storage device may lead to its complete damage.

Due to these issues, there is an urgent need of water- and carbonate-free lithium hydroxide and lithium halides such as lithium chloride as raw materials for energy storage systems. However, current industrial processes for the preparation of anhydrous lithium hydroxide and anhydrous lithium halides are very time-, cost- and energy-consuming.

JP 2006-265023 A describes a method for obtaining anhydrous lithium hydroxide by anhydrifying lithium hydroxide monohydrate particles for up to 2 hours at temperatures of 150-600° C. in a rotary kiln. In order to prevent contamination of the product, the rotary kiln needs to be constructed of selected materials being resistant against the exposure of highly corrosive lithium hydroxide, such as ceramics. These specific requirements to the reactor set-up and construction, however, generate high costs for the production process and reactor maintenance.

WO 2018/086862 A1 describes a process for making anhydrous lithium hydroxide at temperatures of 150-500° C. by applying a stream of hot gas which is low in carbon dioxide. Due to the lower residence time in the reactor, the issue of corrosion is reduced. However, excessive heating may lead to an overdrying of lithium hydroxide, resulting in lithium oxide impurities.

Considering the above, there is an urgent need of new methods for producing lithium salts, which are (substantially) free of water, such as anhydrous lithium hydroxide and anhydrous lithium halides, which overcome the drawbacks of the known processes and allow for the provision of improved products being free of disadvantageous side-products.

Thus, an object of the present invention is the provision of a fast, easy and cost-effective method for producing lithium salts, such as lithium hydroxide and lithium halides, which are substantially free of water and optionally other impurities such as lithium oxide and/or lithium carbonate.

It was surprisingly found that subjecting the starting material to a stream of carrier gas at room temperature (20° C.) or at slightly elevated temperatures, such as 20-150° C. and preferably 20-80° C., allows for the provision of substantially dry lithium hydroxide while preventing the formation of disadvantageous side-products. Furthermore, a fast reaction process, minimizing the risk of corrosion and leaching, is achieved.

In a first aspect, the present invention refers to a method for producing a lithium salt, such as lithium hydroxide, which is substantially free of water and optionally other impurities comprising the steps:

(i) providing lithium hydroxide, hydrates, solvates or mixtures thereof as a starting material in a reactor, wherein the starting material is preferably in solid form, and
(ii) subjecting the starting material of step (i) to a stream of carrier gas at room temperature or elevated temperatures.

The starting material provided in step (i) is lithium hydroxide, hydrates, solvates or mixtures thereof. The amount of water present in the starting material may vary due to the hygroscopic nature of lithium hydroxide. Lithium hydroxide may comprise defined amounts of crystal water such as in lithium hydroxide monohydrate and partially hydrated lithium hydroxide, or it may comprise undefined amounts of physically bound water, such as in lithium hydroxide solvates. Preferably, the starting material provided in step (i) is LiOH, $LiOH \cdot H_2O$ or a mixture thereof. However, the amount of water present is not decisive for the outcome of the method according to the invention.

In a preferred embodiment, the starting material is present in solid form. Particularly, the starting material may be present in particulate form, having an average particle size of e.g. up to 2000 μm, preferably 10-1000 μm. In another embodiment, the starting material may be present in the form of agglomerates having an average diameter of e.g. up to 10 mm, such as about 1000-10000 μm.

The reactor may be a heatable reactor, e.g. applied with an electrical heating jacket, a heat exchanger, heater plates and/or a heating coil. Preferably, the reactor provides a controllable temperature over its whole inner surface, thus preventing the condensation of water or the agglomeration of melted or partially melted reaction product, by-product and/or starting material.

In a preferred embodiment, the reactor is a sealable reactor, preferably having a gas inlet tube and a gas outlet tube. By this means, the reaction conditions may be precisely adjusted and controlled, thus avoiding the formation of unintended by-products such as lithium carbonate formed in the presence of carbon dioxide.

In step (ii) the starting material of step (i) is subjected to a stream of carrier gas at room temperature or elevated temperatures, i.e. at temperatures at or above room temperature (20° C.). In a preferred embodiment, step (ii) is conducted at temperatures of 20-150° C., preferably 60-130° C., more preferably 80-100° C. In a particularly preferred embodiment, step (ii) is conducted at a temperature below 100° C. such as at 20-100° C., preferably 20-80° C., more preferably 60-80° C.

The carrier gas may be an inert gas, such as argon, dry air and/or nitrogen. Preferably, the carrier gas is substantially free from water, i.e. having a relative humidity of less than 10 vol.-%, preferably 0.01-5 vol.-%, more preferably less than 2 vol.-%.

The carrier gas may be introduced into the reactor via a gas inlet tube and may exit the reactor via a gas outlet tube. By applying the carrier gas in a controlled manner, i.e. controlling the rate of gas introduced into and/or removed from the reactor, e.g. using gas inlet and gas outlet tubes, a stream of gas is formed in the interior of the reactor.

In one embodiment, the carrier gas is introduced into the reactor at a rate of 0.1-1000 $m^3/h$, preferably 5-500 $m^3/h$, more preferably 10-50 $m^3/h$, particular via the gas inlet tube. The carrier gas may exit the reactor at a rate of 0.1-1000 $m^3/h$, preferably 5-500 $m^3/h$, more preferably 10-50 $m^3/h$, particular via the gas outlet tube.

The rate of gas introduced into and leaving the reactor is e.g. dependent on the amount of starting material, the type of starting material, and the reaction temperature. Moreover, the gas rate may also be dependent on the amount of water formed as a by-product in step (ii), as the removal of said water, e.g. by the stream of carrier gas passing the reaction vessel, is essential for a complete drying of the starting material in step (ii).

Furthermore, the amount of water within the gas stream leaving the reactor may serve as a reaction control to determine the time point of (essentially) complete drying in step (ii). By this means, the duration of step (ii) may be individually adapted to the reaction conditions. Preferably, the duration of step (ii) is up to 1 h, such as 10 seconds to 15 minutes, dependent on the individual reaction conditions.

In one embodiment, the carrier gas acts as a fluid, e.g. in a fluidized bed reactor. Fluid based processes offer an optimum ratio of starting material surface area to carrier gas, so that the removal of water is accelerated and high efficacy can be achieved even at short reaction times, such as less than 15 minutes, preferably less than 5 minutes, and/or relatively low reaction temperatures, such as 20-150° C., preferably 20-80° C. Such moderate reaction conditions are particularly advantageous in order to avoid the formation of unintended by-products, such as lithium oxide, which is formed when the lithium hydroxide starting material is overdried, e.g. during application of high reaction temperatures and/or long reaction times.

In another embodiment, the starting material may act as a fluid, e.g. in a fluidized bed reactor. Particularly, both, the carrier gas and the starting material act as a fluid. By this means, the residence time of the lithium hydroxide starting material in the reactor may be minimized while an optimum contact of starting material and carrier gas is achieved, so that the reaction is accelerated and corrosion of the reactor is minimized.

Step (ii) may be conducted under inert gas atmosphere, such as argon, dry air and/or nitrogen gas atmosphere. The inert gas is preferably substantially free from water, i.e. having a relative humidity of less than 10 vol.-%, preferably 0.01-5 vol.-%, more preferably less than 2 vol.-%. In a preferred embodiment, the inert gas is essentially the same as the carrier gas.

In order to provide a proper reaction atmosphere during step (ii), the reaction vessel may be sealed, thus being isolated from the surrounding, while the gas inlet tube and the gas outlet tube allow for the controlled introduction and removal of carrier gas and optionally inert gas into and removal of carrier gas, water, and optionally inert gas from the vessel. A suitable reaction vessel is e.g. a heatable fluidized bed reactor known in the art.

The product obtained after step (ii) is substantially free of water, i.e. having a water content of e.g. less than 1.0 wt.-%, preferably not more than 0.5 wt.-%, more preferably 0.001 to 0.5 wt.-% based on the total product weight, such as anhydrous lithium hydroxide.

Preferably, the product obtained after step (ii) is substantially free of lithium oxide ($Li_2O$) and/or lithium carbonate ($Li_2CO_3$). Substantially free of lithium oxide means that the $Li_2O$ content is less than 1.0 wt.-%, preferably not more than 0.5 wt.-%, preferably 0.001 to 0.5 wt.-%, particularly 0.001 to 0.25 wt.-% based on the total product weight. Substantially free of lithium carbonate means that the $Li_2CO_3$ content is less than 1.0 wt.-%, preferably not more than 0.5 wt.-%, preferably 0.001 to 0.5 wt.-%, particularly 0.001 to 0.25 wt.-% based on the total product weight. The absence or amount of water, lithium oxide, and/or lithium carbonate present can be detected by conventional means known in the art, such as gravimetric analysis, X-ray powder diffraction (XRD), or Karl-Fischer titration. Particularly, the product obtained after step (ii) is substantially free of lithium oxide and lithium carbonate.

The method according to the invention may further comprise step (iii) of contacting the product obtained after step (ii), i.e. anhydrous lithium hydroxide, with a halogen-containing gas, thereby forming lithium halides.

Preferably, step (iii) is carried out at room temperature or elevated temperatures, i.e. at or above room temperature (20° C.), such as at 20-300° C., preferably 80-200° C., more preferably 80-150° C.

The halogen-containing gas may be selected from the group consisting of HCl, HBr, HF, HI, and mixtures thereof, preferably HCl, HBr, and mixtures thereof.

The amount of halogen-containing gas applied may vary, e.g. dependent on the type of halogen-containing gas, the amount of anhydrous lithium hydroxide provided in the reactor and the reaction temperature. In one embodiment, the halogen-containing gas is introduced into the reactor at a rate of 40-5000 g/h, preferably 50-4500 g/h, more preferably 100-3000 g/h.

In case the halogen-containing gas is HF, it may be introduced into the reactor at a rate of e.g. 50-5000 g/h, preferably 50-2000 g/h, more preferably 50-1000 g/h.

In case the halogen-containing gas is HCl, it may be introduced into the reactor at a rate of e.g. 50-5000 g/h, preferably 50-3000 g/h, more preferably 50-1500 g/h.

In case the halogen-containing gas is HBr, it may be introduced into the reactor at a rate of e.g. 50-5000 g/h, preferably 200-3000 g/h, more preferably 250-3000 g/h.

In case the halogen-containing gas is HI, it may be introduced into the reactor at a rate of e.g. 50-5000 g/h, preferably 200-5000 g/h, more preferably 400-4500 g/h.

The halogen-containing gas may be introduced into the reactor via a gas inlet tube and may exit the reactor via a gas outlet tube. By applying the halogen-containing gas in a controlled manner, i.e. controlling the rate of gas introduced into and/or removed from the reactor, e.g. using gas inlet and gas outlet tubes, a stream of gas is formed in the interior of the reactor.

In one embodiment, step (iii) comprises applying a stream of gas comprising the halogen-containing gas, preferably in a volume concentration of 0.001-100 vol.-%, more preferably 1.0-10 vol.-% based on the total volume of the gas stream.

In another embodiment, step (iii) comprises applying a stream of gas comprising a carrier gas. The carrier gas may be an inert gas, such as argon, dry air and/or nitrogen, and is preferably the same as the carrier gas applied in step (ii). Preferably, the carrier gas applied in step (iii) is substantially free from water, i.e. having a relative humidity of less than 10 vol.-%, preferably 0.01-5 vol.-%, more preferably less than 2 vol.-%.

The carrier gas may be introduced into the reactor via a gas inlet tube and may exit the reactor via a gas outlet tube. In one embodiment, the carrier gas is introduced into the reactor at a rate of 0.1-1000 $m^3/h$, preferably 5-500 $m^3/h$, more preferably 10-50 $m^3/h$, particular via the gas inlet tube. The carrier gas may exit the reactor at a rate of 0.1-1000 $m^3/h$, preferably 5-500 $m^3/h$, more preferably 10-50 $m^3/h$, particular via the gas outlet tube.

The halogen-containing gas and the carrier gas may be provided sequentially or simultaneously in step (iii). In a preferred embodiment, the halogen-containing gas and the carrier gas are provided simultaneously, wherein they may be contacted, preferably mixed via conventional techniques known in the art, prior to step (iii).

In a preferred embodiment, step (iii) comprises applying a stream of gas comprising a carrier gas and a halogen-containing gas, wherein the carrier gas and the halogen-containing gas are as defined above. Particularly preferred, step (iii) comprises applying a stream of gas comprising a carrier gas and a halogen-containing gas with the halogen-containing gas in a concentration of 0.001-30 vol. %, preferably 1.0-10 vol. %, based on the total volume of the gas stream.

The rate of halogen-containing gas and/or carrier gas introduced into and leaving the reactor is e.g. dependent on the amount of anhydrous lithium hydroxide obtained in step (ii), the type of halogen-containing gas, and the reaction temperature. Moreover, the gas rate may also be dependent on the amount of water formed as a by-product in step (iii), as the removal of said water, e.g. by the stream of gas passing the reaction vessel, is essential for a full conversion of the lithium hydroxide in step (iii).

Furthermore, the amount of water by-product may serve as a reaction control to determine the time point of (essentially) complete conversion in step (iii). By this means, the duration of step (iii) may be individually adapted to the reaction conditions. Preferably, the duration of step (iii) is up to 2 h, such as 5-90 minutes, preferably 30-90 minutes, dependent on the individual reaction conditions.

In one embodiment, the carrier gas (optionally together with the halogen-containing gas) acts as a fluid, e.g. in a fluidized bed reactor. Thus, an optimum contact of anhydrous lithium hydroxide to carrier gas is achieved, so that the removal of water is accelerated and high yields can be obtained even at short reaction times, such as less than 30 minutes, preferably 5-30 minutes and/or relatively low reaction temperatures, such as 80-150° C. particularly below 100° C.

In one embodiment, the product obtained after step (ii) may act as a fluid, e.g. in a fluidized bed reactor. Particularly, both, the carrier gas and the product obtained after step (ii) act as a fluid. By this means, the residence time of anhydrous lithium hydroxide in the reactor is minimized while an optimum contact of anhydrous lithium hydroxide to carrier gas and/or halogen-containing gas is achieved, so that the reaction is accelerated and corrosion of the reactor is minimized.

Step (iii) may be conducted under inert gas atmosphere, such as argon, dry air and/or nitrogen gas atmosphere. The inert gas is preferably substantially free from water, i.e. having a relative humidity of less than 10 vol. %, preferably 0.01-5 vol. %, more preferably less than 2 vol. %. In a preferred embodiment, the inert gas is essentially the same as the carrier gas applied in step (iii).

In order to provide a proper reaction atmosphere during step (iii), the reaction vessel may be sealed, thus being isolated from the surrounding, while the gas inlet tube and the gas outlet tube allow for the controlled introduction and removal of carrier gas, inert gas, halogen-containing gas and/or water vapor into and from the vessel, respectively. A suitable reaction vessel is e.g. a heatable fluidized bed reactor known in the art.

In another aspect, the present invention refers to a method of producing lithium halide comprising the steps of (i) providing lithium hydroxide, hydrates, solvates or mixtures thereof as a starting material in a reactor, wherein the starting material is preferably in solid form,
(ii) subjecting the starting material of step (i) to a stream of carrier gas at room temperature or elevated temperatures, and
(iii) contacting the product obtained after step (ii) with a halogen-containing gas, thereby forming lithium halides, wherein steps (i)-(iii) are as described herein.

Lithium halides may be used in various fields such as in the production of lithium metal and solid electrolytes. Lithium halides are usually obtained by precipitation from aqueous solutions resulting in a lithium halide hydrate phase, which must be dried afterwards. This is commonly performed using toxic agents such as thionyl chloride, resulting in the formation of harmful by-products, e.g. $SO_2$ gas. Moreover, the starting materials such as lithium hydroxide and lithium chloride solutions are highly corrosive and therefore place high demands on the reactor materials used.

In contrast, the method of producing lithium halides according to the present invention does not require the use of toxic reactants such as thionyl chloride. In addition, by avoiding the highly corrosive aqueous phases of lithium oxide and lithium halide, the choice of reactor material is less restricted and thus, a more cost-effective reaction procedure is provided. Moreover, when performed as fluid based process, the residence time of lithium hydroxide and lithium halide in the reactor is minimized while an optimum ratio of educt surface area to halogen-containing reaction gas and carrier gas is achieved, so that the reaction is accelerated and corrosion of the reactor is avoided.

In another aspect, the present invention refers to a lithium salt product obtainable by a method as described herein.

Particularly, the present invention refers to lithium hydroxide which is substantially free of water obtainable by a method as described herein. In a preferred embodiment, the lithium hydroxide is free of water and lithium oxide. Particularly, the lithium hydroxide is free of water (i.e. anhydrous), lithium oxide and lithium carbonate.

"Free of . . . " in the sense of the present invention means that the content of the respective compound is less than 1.0 wt.-%, preferably not more than 0.5 wt.-%, preferably 0.001 to 0.5 wt.-%, particularly 0.001 to 0.25 wt.-% based on the total product weight. The absence or amount of water, lithium oxide, and/or lithium carbonate present can be detected by conventional means known in the art, such as gravimetric analysis, X-ray powder diffraction (XRD) or Karl-Fischer titration.

In contrast to anhydrous lithium hydroxide obtainable by methods known in the art, particularly including high-temperature treatment, the lithium hydroxide obtainable by a method according to the invention has an improved product homogeneity and purity, lacking unreacted starting material and by-products such as lithium carbonate and lithium oxide. By this means, lithium hydroxide having improved properties for further processing and the application in energy storage devices is obtained.

In another embodiment, the present invention refers to a lithium halide, such as lithium chloride, obtainable by a method as described herein. Preferably, the lithium halide is free of water, lithium hydroxide and lithium oxide. Particularly, the lithium halide obtainable by a method as described herein is free of water (i.e. anhydrous), lithium hydroxide, lithium oxide and lithium carbonate.

In still another aspect, the present invention refers to a use of anhydrous lithium hydroxide according to the invention for the production of solid electrolytes. In a further aspect, the present invention refers to a use of anhydrous lithium hydroxide according to the invention for the production of lithium metal. In a further aspect, the present invention refers to a use of anhydrous lithium hydroxide according to the invention for the production of lithium halides, particularly lithium halides, which are substantially free of water. In a further aspect, the present invention refers to a use of anhydrous lithium hydroxide according to the invention for the production of lithium carbonate.

In still another aspect, the present invention refers to a use of a lithium halide, particularly lithium chloride, according to the invention for the production of solid electrolytes. In a further aspect, the present invention refers to a use of a lithium halide, particularly lithium chloride, according to the invention for the production of lithium metal. In a further aspect, the present invention refers to a use of a lithium halide, particularly lithium chloride, according to the invention for the production of lithium carbonate.

The present invention shall be further illustrated in more detail but not limited by the following figures and examples.

FIG. 1: Powder X-ray diffraction pattern of LiOH obtained according to Example 3 (lower pattern) and comparative Example 2 (upper pattern), measured with CuKα radiation in a 2θ range from 10-90° and displayed as relative intensity $I_{rel}$.

Figure 2:
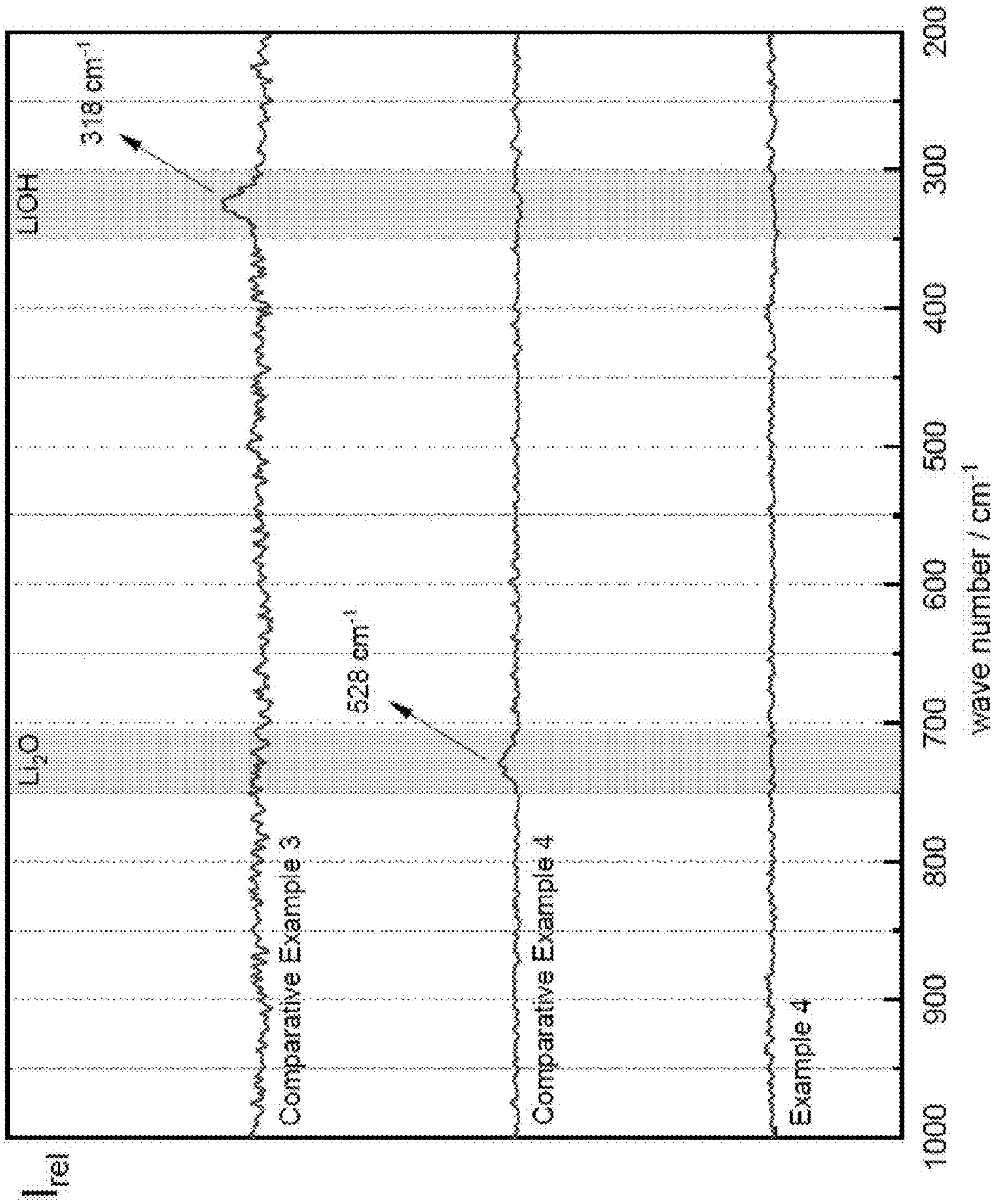

FIG. 2: Raman spectrum of LiCl obtained according to Example 4 (lower spectrum) and comparative Examples 3 (upper spectrum) and 4 (middle spectrum), measured with a laser wavelength of 532 nm from 50-1866 $cm^{-1}$ and displayed as relative intensity $I_{rel}$.

METHODS

X-ray powder diffraction analysis was conducted on a Bruker D2 phaser diffractometer with $CuK_\alpha$ radiation in a 2θ range of 10-90° with a step width of 0.040° displayed as relative intensity $I_{rel}$. Semiquantitave analysis was conducted by comparing the intensities of the highest reflection of LiOH (2θ=32.5°) and $Li_2O$ (2θ=33.7°).

Raman spectroscopy analysis was performed on a Thermo Fischer Scientific DXR3 SmartRaman spectrometer with a laser wavelength of 532 nm, an exposure time of 1 s with 32 exposure scans from 50-1866 $cm^{-1}$.

The carbonate content was analyzed by potentiometric acid/base titration utilizing a 1N and 0.01N hydrochloric acid, respectively. The measurements had been performed on a Metrohm Titrando 905 system.

The water content was determined by Karl-Fischer coulometry employing the oven method (T=150° C.; gas flow=60 ml/min) using a Metrohm 874 Oven Sample Processor.

Example 1

100.0 g of $LiOH \cdot H_2O$ having a total water content of 42 wt. % were heated at 80° C. for 60 min in a fluidized bed reactor while subjected to a stream of nitrogen gas, yielding anhydrous lithium hydroxide salt.

The water content of the starting material and the product obtained was determined by XRD and Karl-Fischer titration.

No lithium oxide was detected in the product by XRD.

No lithium carbonate was detected in the product by XRD and potentiometric titration.

Example 2

58 g of anhydrous lithium hydroxide, obtained as described in Example 1, were heated at 200° C. for 120 min in a fluidized bed reactor while subjected to a stream of gas, comprising 3 vol. % of HCl and 97 vol. % of nitrogen with respect to the total volume of gas stream, yielding anhydrous lithium chloride salt. The stream of gas was introduced into the reactor at a rate of 1 $m^3$/h.

The water content of the product obtained was determined by XRD and Karl-Fischer titration.

No lithium oxide was detected in the product by XRD.

No lithium carbonate was detected in the product by XRD and potentiometric titration.

No lithium hydroxide was detected in the product by XRD.

Example 3

100.0 g of $LiOH \cdot H_2O$ having a total water content of 43.5 wt. % were heated at 80° C. for 60 min in a fluidized bed reactor while subjected to a stream of nitrogen gas at a rate of 21 $m^3$/h, yielding anhydrous lithium hydroxide salt.

The water content of the starting material and the product obtained was determined by Karl-Fischer titration (See table 1).

The lithium carbonate content was detected in the product by potentiometric titration (See table 1).

Comparative examples 1 and 2 were conducted as described below.

TABLE 1

Water and carbonate content in LiOH according to Example 3 and Comparative Example 1

| | $H_2O$ [wt. %] | $CO_3^{2-}$ [wt. %] |
|---|---|---|
| Example 3 | 0.04 | 0.25 |
| Comparative Example 1 | 1.00 | 1.41 |

No lithium oxide was detected in the product according to Example 3 by XRD (See FIG. 1, lower pattern).

A lithium oxide content of 2.1 wt. % was detected in the comparative example 2 by XRD (See FIG. 1, upper pattern).

Example 4

58 g of anhydrous lithium hydroxide, obtained as described in Example 3, were heated at 200° C. for 120 min in a fluidized bed reactor while subjected to a stream of gas, comprising 3 vol. % of HCl and 97 vol. % of nitrogen with respect to the total volume of gas stream, yielding anhydrous lithium chloride salt. The stream of gas was introduced into the reactor at a rate of 1 $m^3/h$.

The water content of the product obtained was determined Karl-Fischer titration (See table 2).

Comparative examples 3 and 4 were conducted as described below.

TABLE 2

| Water content in LiCl according to Example 4 and Comparative Examples 4 and 5 | |
|---|---|
| | $H_2O$ [wt. %] |
| Example 4 | 0.03 |
| Comparative Example 3 | 1.87 |

No lithium hydroxide was detected in the product by Raman Spectroscopy at 318 $cm^{-1}$ (See FIG. 2, lower spectrum).

Lithium hydroxide was detected in the Comparative Example 3 by Raman Spectroscopy at 318 $cm^{-1}$ (See FIG. 2, upper spectrum).

No lithium oxide was detected in the product by Raman Spectroscopy at 528 $cm^{-1}$ (See FIG. 2, lower spectrum).

Lithium oxide was detected in the Comparative Example 4 by Raman Spectroscopy (See FIG. 2, middle spectrum).

Comparative Examples

Comparative examples 1 and 2 were conducted analogous to example 3, while altering the experimental parameters as summarized in table 3 below.

Comparative examples 3 and 4 were conducted analogous to example 4, while altering the experimental parameters as summarized in table 3 below.

TABLE 3

Experimental parameters for Comparative Examples 1-4.

| Comparative Example No. | Target Product | Carrier gas type | Carrier gas rate [$m^3/h$] | HCl gas rate [$m^3/h$] | Temperature [° C.] |
|---|---|---|---|---|---|
| 1 | LiOH | Air (humid) | 21 | 0 | 80 |
| 2 | LiOH | $N_2$ | 21 | 0 | 400 |
| 3 | LiCl | $N_2$ | 0.05 | 0.03 | 200 |
| 4 | LiCl | $N_2$ | 0.97 | 0.03 | 450 |

The present invention covers the following items:

1. Method for producing a lithium salt which is substantially free of water comprising the steps of:
   (i) providing lithium hydroxide, hydrates, solvates or mixtures thereof as a starting material in a reactor, wherein the starting material is preferably in solid form, and
   (ii) subjecting the starting material of step (i) to a stream of carrier gas at room temperature or elevated temperatures.
2. Method according to item 1, wherein the starting material in step (i) is LiOH, $LiOH \cdot H_2O$ or a mixture thereof.
3. Method according to item 1 or 2, wherein the reactor in step (i) is a heatable reactor.
4. Method according to any of the preceding items, wherein the reactor in step (i) is a sealable reactor, preferably having a gas inlet tube and a gas outlet tube.
5. Method according to any of the preceding items, wherein step (ii) is conducted at temperatures of 20-150° C., preferably 60-130° C., more preferably 80-100° C.
6. Method according to any of the preceding items, wherein the carrier gas is an inert gas, such as argon, dry air and/or nitrogen.
7. Method according to item 6, wherein the carrier gas acts as a fluid, e.g. in a fluidized bed reactor.
8. Method according to any of the preceding items, wherein the carrier gas is introduced into the reactor via the gas inlet tube and exits the reactor via the gas outlet tube.
9. Method according to any of the preceding items, wherein the carrier gas is introduced into the reactor at a rate of 0.1-1000 $m^3/h$, preferably 5-500 $m^3/h$, more preferably 10-50 $m^3/h$.
10. Method according to any of the preceding items, wherein the carrier gas exits the reactor at a rate of 0.1-1000 $m^3/h$, preferably 5-500 $m^3/h$, more preferably 10-50 $m^3/h$.
11. Method according to any of the preceding items, wherein step (ii) is conducted under inert gas atmosphere, such as argon, dry air and/or nitrogen gas atmosphere, which is preferably the same as the carrier gas.
12. Method according to any of the preceding items, wherein the starting material acts as a fluid, e.g. in a fluidized bed reactor.
13. Method according to any of the preceding items, wherein the product obtained after step (ii) has a water content of less than 1.0 wt.-%, preferably not more than 0.5 wt.-%, preferably 0.001 to 0.5 wt.-% based on the total product weight.
14. Method according to any of the preceding items, wherein the product obtained after step (ii) is substantially free of $Li_2CO_3$ and/or $Li_2O$.
15. Method according to any of the preceding items, wherein the method further comprises
    (iii) contacting the product obtained after step (ii) with a halogen-containing gas, thereby forming lithium halides.
16. Method according to item 15, wherein the halogen-containing gas is selected from the group consisting of HCl, HBr, HF, HI, and mixtures thereof, preferably HCl, HBr, and mixtures thereof.
17. Method according to item 15 or 16, wherein step (iii) is carried out at room temperature or elevated temperatures such as 20-300° C., preferably 80-200° C., more preferably 80-150° C.
18. Method according to any of items 15-17, wherein the halogen-containing gas is introduced into the reactor at a rate of 40-5000 g/h, preferably 50-4500 g/h, more preferably 100-3000 g/h.
19. Method according to any of items 15-18, wherein step (iii) comprises applying a stream of gas comprising the halogen-containing gas, preferably in a volume concentration of 0.001-100 vol. %, more preferably 1.0-10 vol. %, based on the total volume of the gas stream.
20. Method according to any of items 15-19, wherein step (iii) comprises applying a stream of gas comprising a carrier gas which is preferably the same as the carrier gas of step (ii).
21. Method according to item 20, wherein the carrier gas acts as a fluid, e.g. in a fluidized bed reactor.
22. Method according to any of items 15-21, wherein the halogen-containing gas and/or the carrier gas is introduced into the reactor via the gas inlet tube and exits the reactor via the gas outlet tube.

23. Method according to any of items 20-22, wherein the carrier gas is introduced into the reactor at a rate of 0.1-1000 $m^3/h$, preferably 5-500 $m^3/h$, more preferably 10-50 $m^3/h$.

24. Method according to any of items 20-23, wherein the carrier gas exits the reactor at a rate of 0.1-1000 $m^3/h$, preferably 5-500 $m^3/h$, more preferably 10-50 $m^3/h$.

25. Method according to any of items 15-24, wherein the product obtained after step (ii) acts as a fluid, e.g. in a fluidized bed reactor.

26. Method according to any of items 15-25, wherein step (iii) is conducted under inert gas atmosphere such as argon, dry air and/or nitrogen gas atmosphere, which is preferably the same as the carrier gas.

27. Method of producing lithium halide comprising the steps (i) and (ii) according to any of items 1-14 and step (iii) according to any of items 15-26.

28. Lithium salt product obtainable by a method according to any of items 1-14.

29. Lithium salt product obtainable by a method according to any of items 15-27.

30. Product according to item 28, which is substantially free of water, $Li_2CO_3$ and/or $Li_2O$, preferably free of water, $Li_2CO_3$ and $Li_2O$.

31. Product according to item 29, which is substantially free of water, LiOH and/or $Li_2O$, preferably free of water, LiOH and $Li_2O$.

32. Use of the product according to any of items 28-31 for the production of solid electrolytes, lithium metal, lithium carbonate or lithium halides, particularly lithium halides, which are substantially free of water.

33. Method according to items 1-27, wherein step (ii) is conducted at temperatures of 20-100° C., preferably 20-80° C., and more preferably 60-80° C.

The invention claimed is:

1. A method for producing a lithium salt which is substantially free of water comprising the steps of:

(i) providing lithium hydroxide as a starting material in a reactor, wherein the starting material is in solid form, and (ii) subjecting the starting material of step (i) to a stream of carrier gas at room temperature or elevated temperatures in a range of 20-80° C.

(iii) contacting the product obtained after step (ii) with a halogen-containing gas, thereby forming lithium halides, wherein step (iii) is carried out at room temperature or elevated temperatures in a range of 20-300° C., and wherein the halogen-containing gas is selected from the group consisting of HCl, HBr, HF, HI, and mixtures thereof.

2. The method according to claim 1, wherein the starting material in step (i) is LiOH, $LiOH \cdot H_2O$ or a mixture thereof.

3. The method according to claim 1, wherein the carrier gas is an inert gas, including argon, dry air and/or nitrogen.

4. The method according to claim 1, wherein the carrier gas is introduced into the reactor at a rate of 0.1-1000 $m^3/h$ and/or exits the reactor at a rate of 0.1-1000 $m^3/h$.

5. The method according to claim 1, wherein the product obtained after step (ii) is substantially free of $Li_2CO_3$ and/or $Li_2O$.

6. The method according to claim 1, wherein the halogen-containing gas is introduced into the reactor at a rate of 40-5000 g/h.

7. The method according to claim 1, wherein step (iii) comprises applying a stream of gas comprising the halogen-containing gas in a volume concentration of 0.001-100 vol. %, based on the total volume of the gas stream.

8. The method according to claim 1, wherein step (iii) comprises applying a stream of gas comprising a carrier gas.

9. The method according to claim 1, wherein the carrier gas is introduced into the reactor at a rate of 0.1-1000 $m^3/h$ and/or exits the reactor at a rate of 0.1-1000 $m^3/h$.

10. The method according to claim 1, wherein the carrier gas and/or the starting material and/or the halogen containing gas acts as a fluid in a fluidized bed reactor.

* * * * *